Figure 1:
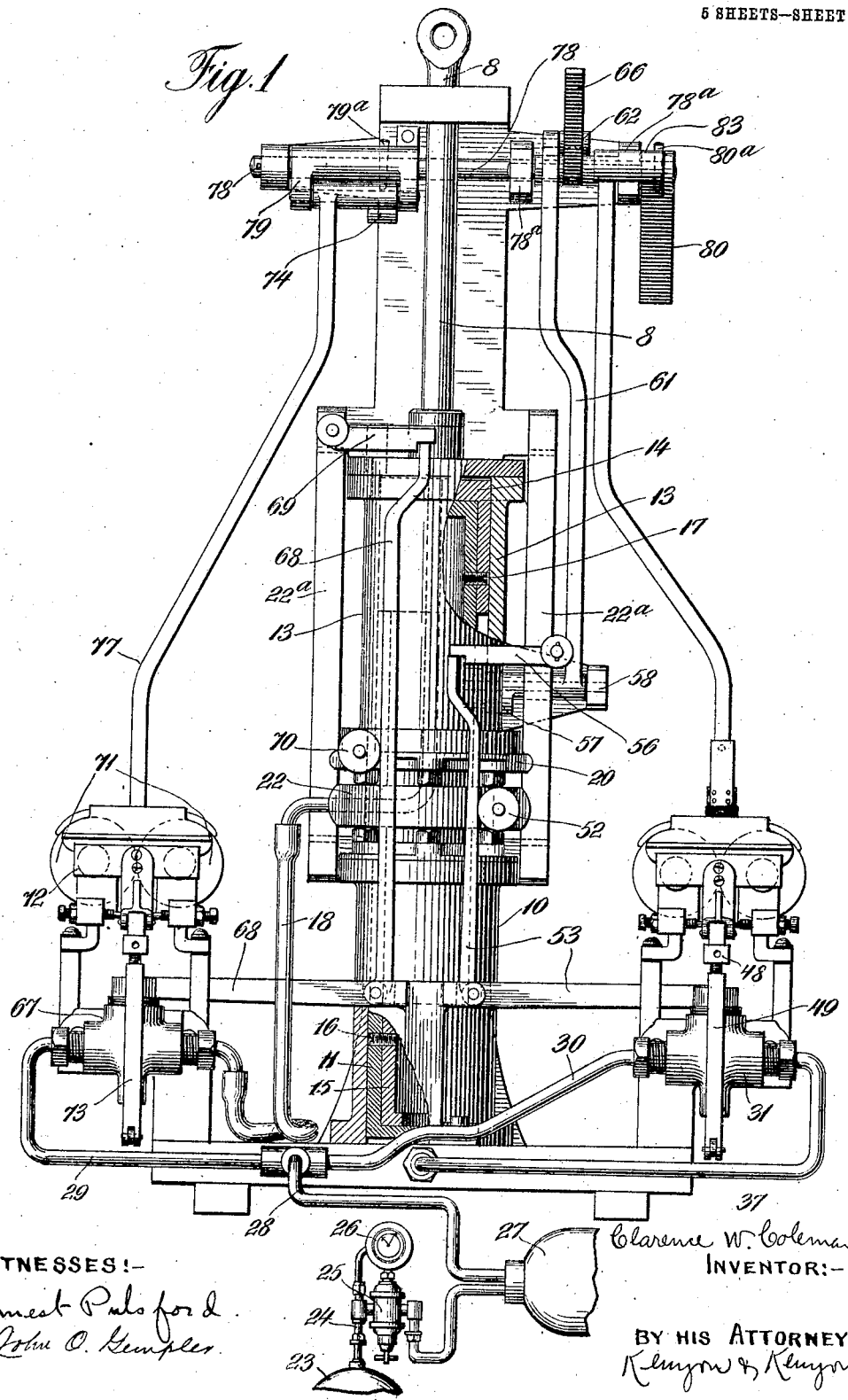

No. 846,779. PATENTED MAR. 12, 1907.
C. W. COLEMAN.
SIGNALING APPARATUS.
APPLICATION FILED OCT. 12, 1905.

5 SHEETS—SHEET 1.

WITNESSES:—
Ernest Pulsford
John O. Gempler

Clarence W. Coleman
INVENTOR:—

BY HIS ATTORNEYS
Kenyon & Kenyon

No. 846,779. PATENTED MAR. 12, 1907.
C. W. COLEMAN.
SIGNALING APPARATUS.
APPLICATION FILED OCT. 12, 1905.
5 SHEETS—SHEET 2.
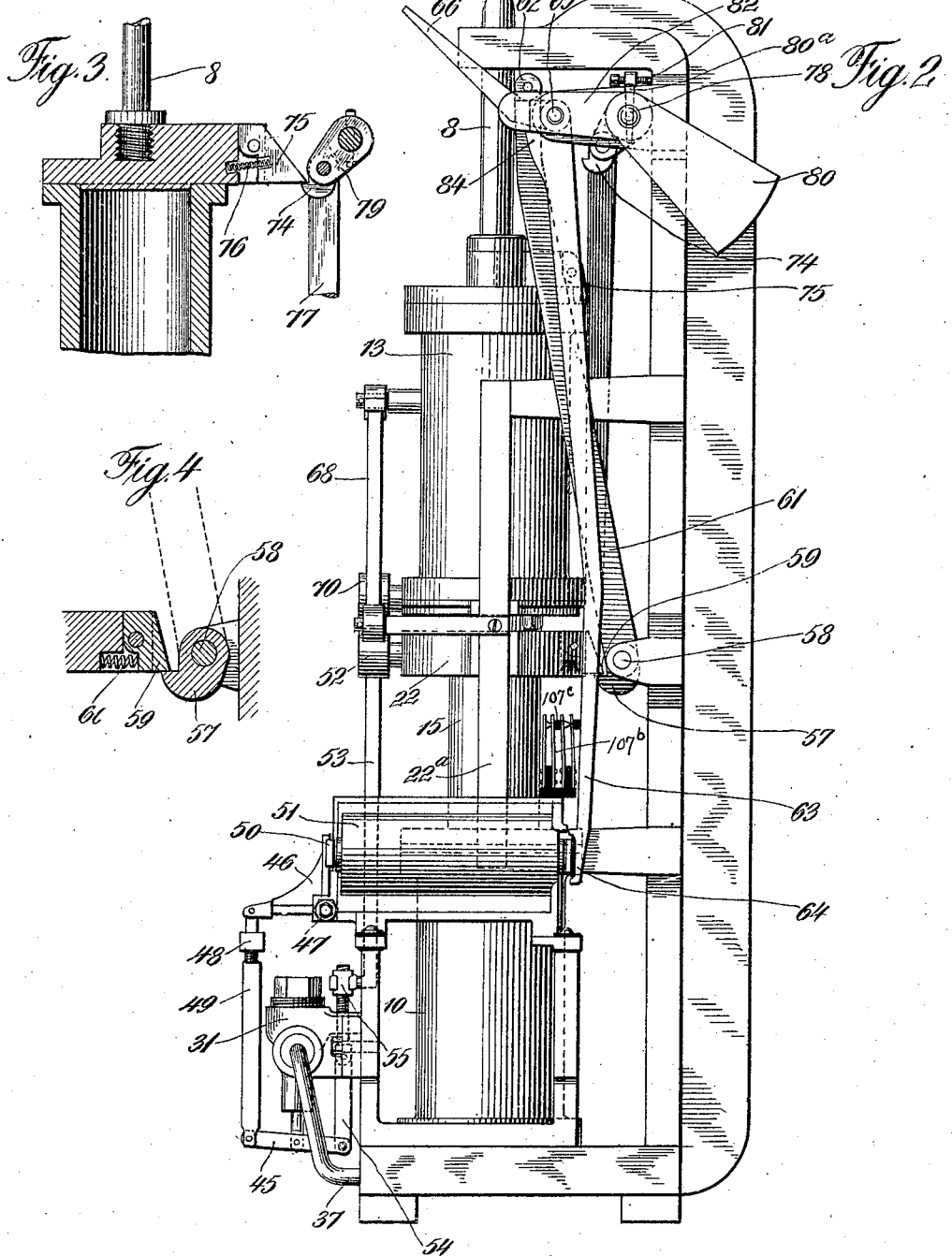
WITNESSES:—
Ernest Pulsford.
John O. Gempler.
INVENTOR:—
Clarence W. Coleman.
BY HIS ATTORNEYS
Kenyon & Kenyon No. 846,779. PATENTED MAR. 12, 1907.
C. W. COLEMAN.
SIGNALING APPARATUS.
APPLICATION FILED OCT. 12, 1905.
5 SHEETS—SHEET 3.
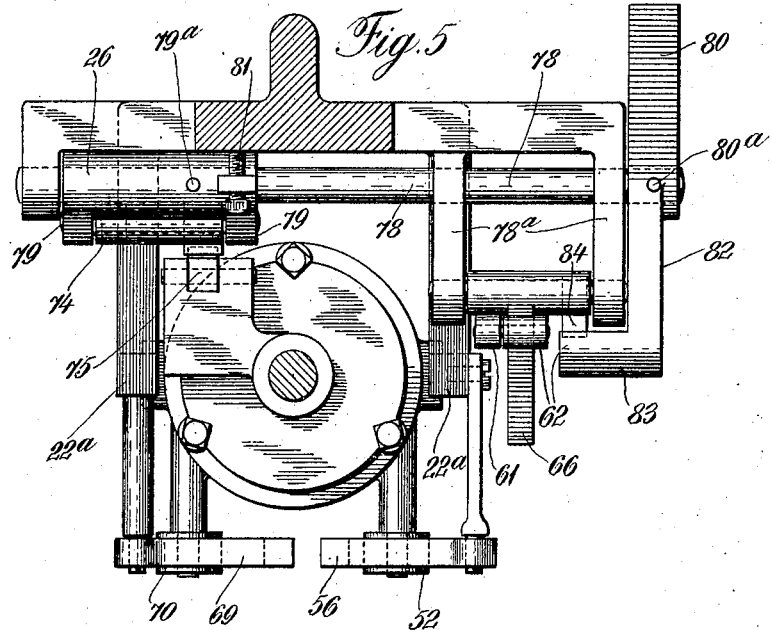
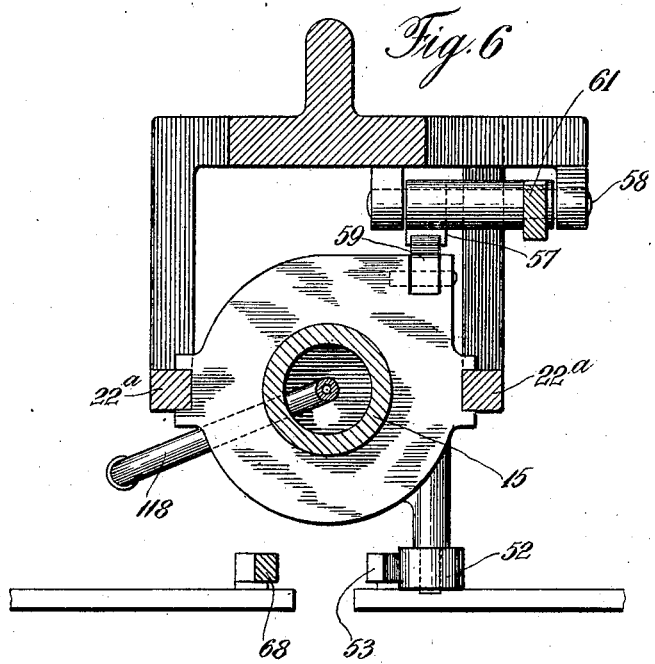
WITNESSES:-
Ernest Pulsford
John O. Gemples
INVENTOR:-
Clarence W. Coleman
BY HIS ATTORNEYS
Kenyon & Kenyon No. 846,779. PATENTED MAR. 12, 1907.
C. W. COLEMAN.
SIGNALING APPARATUS.
APPLICATION FILED OCT. 12, 1905.

5 SHEETS—SHEET 4.

WITNESSES:
Ernest Pulsford
John O. Gempler

INVENTOR:
Clarence W. Coleman
BY HIS ATTORNEYS
Kenyon & Kenyon

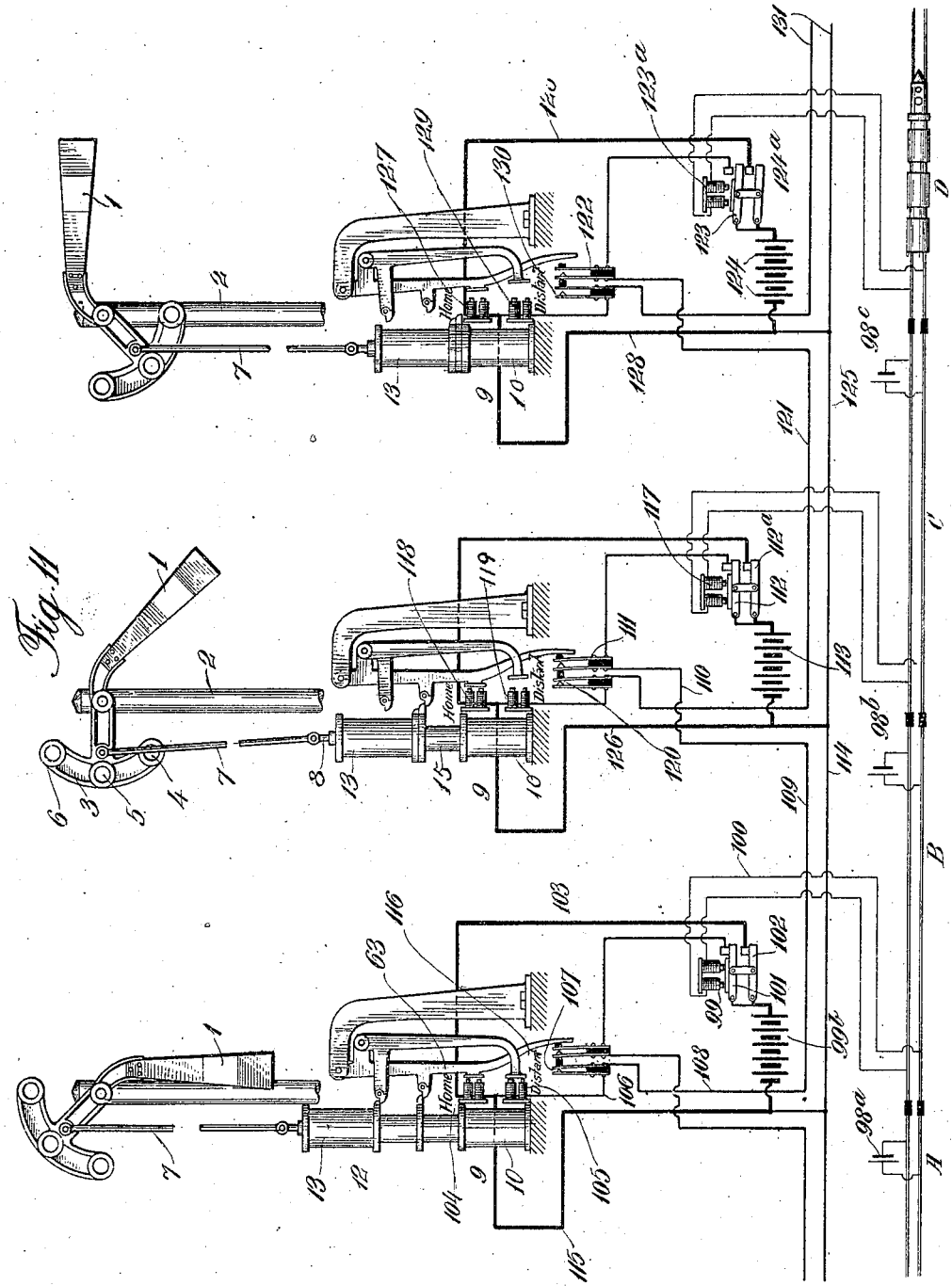

UNITED STATES PATENT OFFICE.

CLARENCE W. COLEMAN, OF WESTFIELD, NEW JERSEY, ASSIGNOR TO THE HALL SIGNAL COMPANY, A CORPORATION OF MAINE.

SIGNALING APPARATUS.

No. 846,779.  Specification of Letters Patent.  Patented March 12, 1907.

Application filed October 12, 1905. Serial No. 282,381.

*To all whom it may concern:*

Be it known that I, CLARENCE W. COLEMAN, a citizen of the United States, and a resident of Westfield, county of Union, and State of New Jersey, have invented Signaling Apparatus, of which the following is a specification.

My invention relates to railway signaling apparatus in which a signal, and in particular a signal-blade, is made to assume different positions of indication for different conditions of the track.

In an ordinary form of railway signaling system a home signal is used, which gives the condition of the home blocks—*i. e.*, the block at the entrance to which the signal is located. In a two-signal-blade system the home signal is usually given by the upper blade. A distant signal is also commonly used, which gives an indication of the condition of the block next in advance of the home block. The lower blade in an ordinary two-blade system is ordinarily used to give the distant signal. The distant signal in a two-blade-signal system repeats the position of the home signal of the block ahead and follows its indications. When one signal-blade is used instead of two or more blades, as in the ordinary three-position signaling system, this blade giving three positions is used to indicate the conditions of the track instead of indicating them by means of two blades. The horizontal position of a three-position signal indicates "stop," showing that the home block, at the entrance to which the signal is located, is occupied. The inclined position indicates "caution"—that is, the home block is clear but the next block ahead is occupied. The vertical position of the blade indicates "all clear"—that is, the home block is clear as well as the block ahead. Thus by means of a single blade the condition of two blocks—namely, the home block and the distant block—is given.

The object of my invention is to provide a simple and improved means for giving a signal a plurality of positions of indication.

A further object of my invention is to provide means for giving a signal-blade a plurality of positions of indication by means of a motive power stored in local self-contained storage-tanks, at the same time economizing the amount of fluid used. In this aspect of my invention when, as is usually the case, carbonic-acid gas is used as a motive power an object of my invention is to produce a means for giving a signal-blade several positions of indication and to move the signal to each of its positions of indication by the expenditure of a minimum amount of gas. With this object in view the means for moving the signal-blade to one position is also utilized, in the best embodiment of my invention, in moving the means that moves the signal-blade to a different position of indication.

A further object of my invention is to provide means for controlling the means for holding the signal at its various positions, whereby when one of the holding means is operated to release the signal the other is also operated, and yet one of the holding means may be operated independently of the other.

A further object of my invention is to provide means for holding the signal at the different positions to which it has been moved, the means for holding the signal at one position acting as an abutment for the means which move the signal to another position.

With the above and other objects in view my invention consists in the parts, improvements, and combinations more fully set out in the claims.

Figure 7:
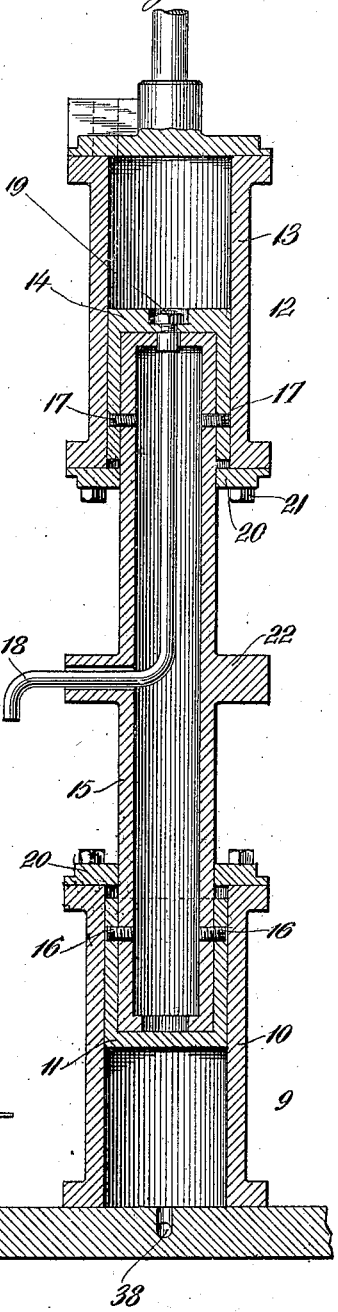
Figure 8:
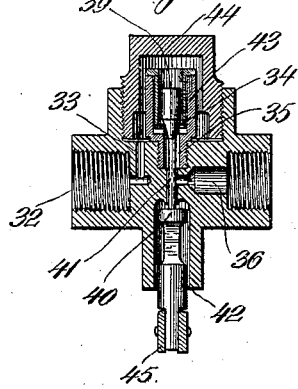
Figure 9:
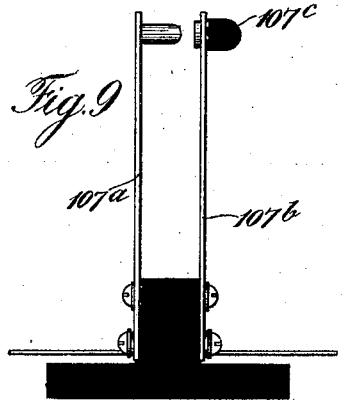
Figure 10:
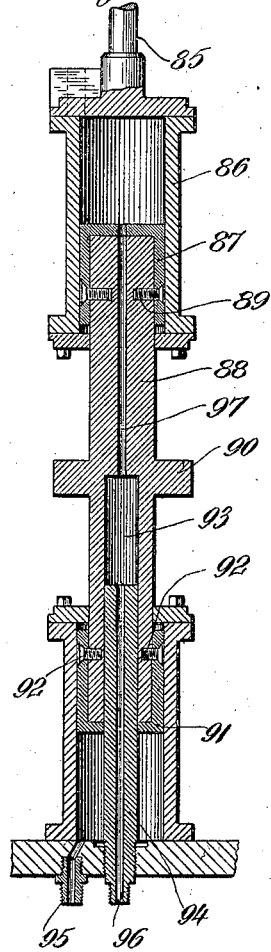

Turning now to the accompanying drawings, attached to this specification and forming part thereof, Figure 1 is a front elevation illustrating the motors used to actuate the signal. Fig. 2 is a side elevation showing the motors for moving the signal and the detents for holding the signal. Fig. 3 is a detailed section illustrating one of the detents. Fig. 4 is a detailed section illustrating another detent. Fig. 5 is a transverse section illustrating the detents and their operating mechanism. Fig. 6 is a transverse section on a plane below that of Fig. 5. Fig. 7 is a longitudinal section illustrating the construction of the motors used to actuate the signal. Fig. 8 is a sectional view of the valve mechanism used to supply motive fluid to and permit it to exhaust from a motor. Fig. 9 is a detail of one of the electrical switches used. Fig. 10 is a sectional view of a modified arrangement of motors. Fig. 11 illustrates, in a diagrammatic view, the application of my invention to an ordinary railway-track.

1 is the signal-blade, (see Fig. 11,) pivoted to the usual post 2 and supplied with a counterweight 3, which counterweight is of sufficient size to give a normal bias of the signal-blade to "danger" and return the signal-blade to "danger" when necessary. The counterweight 3 is shown in the form of a spectacle, carrying three glasses 4, 5, and 6. The usual lamp is provided behind the spectacle. The signal-blade is connected with its operating-motor by means of a connecting-rod 7, which is pivoted to a rod 8, projecting from the motor.

As illustrated in the drawings, the signal-blade is designed to give three positions of indication—"danger," "caution," and "safety"—although this number may be varied. The means for giving the signal its different positions of indication consist, in the best embodiment of my invention, of a plurality of gas-operated motors, which motors are so constructed and arranged as to give the signal the desired positions with the minimum waste of motive fluid.

In order to economize gas, I construct the piston-chambers of the two motors of equal capacity and so arrange them that the movement of one motor is directly added to the movement given to the signal by the other motor. The motor 9, consisting of the piston-chamber 10 and piston 11 in the particular embodiment of my invention illustrated in the drawings, moves the signal from "danger" to "caution," and the motor 12, consisting of the piston-chamber 13 and piston 14, moves the signal from "caution" to "safety." The pistons 11 and 14 are provided with the usual long bearing-surfaces, fitting easily into their respective cylinders, so as to prevent the escape of gas.

Suitable means are provided whereby the movement of one part of the motor 9 is transmitted to the motor 12. In the best embodiment of my invention I make use of a thrust member, which communicates a bodily movement to the motor 12. The means for accomplishing this result may be widely varied. As illustrated in the drawings, I provide a beam, which is connected to the pistons of the two motors. The means for effecting the connections between the pistons and the beam may be widely varied. As illustrated upon the drawings, the piston 11 is secured to the beam 15 by means of screws 16. The piston 14 is secured to the beam by means of screws 17. In the best embodiment of my invention the beam is made hollow in whole or in part to permit of the introduction of gas into motor 12. In the construction shown in Fig. 7 gas is supplied to the motor 12 by means of a pipe 18, passing through the hollow beam. The mouth of the pipe is secured to the beam and piston by a nut 19. In the embodiment of my invention illustrated in Fig. 10, which will be more specifically described hereinafter, gas is fed to the motor by means of a gas passage-way passing through the hollow thrust member. Cap-plates 20, secured by bolts 21, inclose the piston-chambers.

I make use of a seat 22, mounted on the thrust member, to support the upper motor, and the motor 12 is supported and partly guided by the thrust member. Both motors are also guided and prevented from rotating by means of ways 22ª, fastened to the stationary parts of the machine with which the cap-plates 20 engage.

The means for supplying the gas to the motors may be widely varied. As illustrated upon the drawings, a storage-tank 23 is connected by pipes 24, reducing-valve 25, surmounted by pressure-gage 26, to expansion-chamber 27, from which the pipe 28 leads to branch pipes 29 and 30. The pipe 30 admits gas to the valve mechanism 31, which valve mechanism is more fully illustrated in Fig. 8. The gas enters at the port 32, passes through the passage 33, through the valve-opening 34, passage 35, to outlet 36, which communicates, by means of pipe 37, with the bottom of the piston-chamber 10, the gas entering the chamber at 38. The admission-valve 39 is attached to the exhaust-valve 40 by the stem 41. The gas at the proper time exhausts through 36 by the valve 40 and passes out at 42. The thimble 43 provides a removable valve-seat, and the screw-cap 44 closes the valve-casing. The floating lever 45 is attached to the lower end of the valve-stem. The bell-crank 46, pivoted at 47, is adjustably connected at 48 to the link 49, which in turn is pivoted to the lever 45. The bell-crank 46 carries an armature 50, which is attracted by the electromagnet 51—the so-called "home" magnet. The magnet 51 being energized, valve 39 opens, exhaust-valve 40 closes, and the gas passes through 32, through the passage-ways into 36, and then into the motor 9. The piston 11 rises, and when the piston reaches the top of its stroke it cuts off the admission of gas by the following means: The part carrying the roller 52 is connected with the piston. The roller 52 rides along one side of the bell-crank 53. This bell-crank is connected to the floating lever 45 by means of a link 54. An adjustment 55 is provided between the bell-crank and the link. A latch 56, pivoted to the frame of the machine, normally holds the bell-crank 53 in the position indicated. When the piston 11 rises, the arm 52 strikes the latch 56 and the bell-crank 53 swings so as to lower the admission-valve 39 to its seat and open the exhaust 40. By this means, after the piston has made a full-stroke movement the gas escapes from the motor.

In its generic features my invention is not limited to the use of mechanical devices for holding either or both motors at the ends of their strokes, as such means may be omitted and gas-pressure relied upon to perform this function. In one particular embodiment of my invention in order to hold the signal at the position to which it has been moved suitable mechanical devices are provided for so holding the signal, said devices being preferably controlled by the home magnet. The construction of these devices may be widely varied. As illustrated, the detent 57, pivoted at 58 in the frame of the machine, engages the pivoted latch 59, pressed by the spring 60, said latch being pivoted in a part connected to the thrust-beam. The detent 57 is preferably made integral with the arm 61, which carries the roller 62 at its outer end. The lever 63, provided with an armature 64, is pivoted at 65 in the frame of the machine and carries the extended lever-arm 46. When the magnet 51 is energized, the arm 66, which is always in engagement with roller 62, rocks the detent 57, so that it may engage and support the piston of the motor 9 by coöperating with the latch 59. When magnet 51 is deënergized, (see Figs. 2 and 5,) the armature 63 can move away from the magnet, the arm 66 rocks, and the roller 62 runs along the arm 66 toward the outer free end of the arm. The arm 61, which carries the roller 62, thus swings about the pivot 58, and the detent 57 rocks from beneath the latch 59, the weight of the part 22 of the motor and of the parts connected therewith acting by gravity to free the detent 57 from the latch 59 when magnet 51 is deënergized. It will thus be seen that the motor 9 moves the signal from "danger" to "caution" and that the signal is held at "caution" by means of the detent 57 until released.

In order to move the signal from "caution" to "safety," gas is admitted into the motor 12. This gas comes from the tank 23 through the pipe 29 and into the valve mechanism 67. The bell-crank 68, latch 69, and roller 70, said roller being connected to a moving part of motor 12, actuate the valve mechanism 67 to close the admission-port and open the exhaust-port when the motor has reached the end of its stroke. The valve mechanism 67 is the same as the valve mechanism 31. The distant magnet 71 attracts its armature 72, which, by means of the link 73, opens the admission-valve and closes the exhaust-valve of the valve mechanism 67 in the usual way. It will be observed that in the specific embodiment of my invention illustrated upon the drawings the detent 57 serves as an abutment, by means of which the motor 12 moves the signal to the safety position from the caution position, to which latter position the signal has been moved by the motor 9. Moreover, under certain conditions, when the circuits for the home and distant magnets are closed in quick succession both motors receive gas before either motor has completed its movement. The gas in motor 9 then serves as an abutment for the gas in motor 12.

Suitable means are provided for holding the signal at the safety position. This means may be widely varied. I have shown a detent 74, which coöperates with the latch 75, pressed by the spring 76, that is secured to the motor 12. This detent holds the signal at "safety" and is operated by the arm 77, carrying an armature that is attracted by the magnet 71. When the distant magnet 71 is energized, the detent 74 will act to hold the signal at "safety;" when deënergized, the signal goes to another position.

In accordance with my invention I provide means whereby when the home magnet is operated both detents are released, so that the signal may go from "safety" to "danger" in one movement. Means are provided whereby when a particular one of said detents— as, for example, the "caution" detent— is released the "safety" detent is also released, and the means are so constructed and arranged that each of the detents is independently operatable. In the best embodiment of my invention I provide mechanical connections between the means for operating the detents. In the embodiment of my invention illustrated upon the drawings a rock-shaft 78 is mounted in brackets 78$^a$ in the frame of the machine. Arms 79 are connected, by means of pin 79$^a$, to the rock-shaft, the detent 74 being pivotedly mounted in said arms. A weight 80, secured to the shaft by pin 80$^a$, tends to move the detent into the path of movement of the latch 75, and an adjustable screw 81 limits the extent of this movement. The screw is secured to the rock-shaft. An arm 82, carrying a projection 83, normally rests on a stop 84, which stop is secured to the lever 63. When the magnet 51 is energized, it attracts its armature 64, which holds the stop 84 under the projection 83 and prevents the rock-shaft 78 from rotating. If the motor 12 is being supported by the detent 74, owing to the fact that the magnet 71 is attracting its armature, it will be observed that the signal is held at "safety." If now the home magnet 51 is deënergized, the detent 57 permits the lower motor to drop, and stop 84 is free to move from under the projection 83, so that the weight of the parts release the detent 74 from engagement with the latch 75, the detent swinging bodily away from the latch as the shaft 78 rocks, and the signal goes to "danger." If the home magnet 51 is energized and the stop 84 prevents the rocking of the shaft 78, nevertheless the deënergization of the distant magnet will permit the detent 74 to oscillate about its pivot in the arms 79, and thus permit the motor 12 to drop, the signal going from "safety" to "caution." Means are thus provided for independently operating the detents, and also when the signal is standing at "safety" means are provided whereby when the home magnet releases the "caution" detent the "safety" detent is also released, so that the signal returns to the danger position in one uninterrupted movement.

In the modification of my invention illustrated in Fig. 10 I provide a telescopic connection between the gas-supply and the motor. The signal-rod 85 is connected to the piston-chamber 86, and piston 87 is connected to a thrust member 88 by screws 89 in the same way as illustrated in Fig. 7. The seat 90 on the thrust member 88 normally supports the piston-chamber 86. The piston 91 is secured to the thrust member 88 by screws 92. The thrust member is bored out at 93 to receive the pipe 94, which is attached to the pipe leading from the inlet-valve. Pipe 95, which is screw-threaded and inserted into the base of the machine, supplies gas to and permits the exhaust of gas from the lower motor. The pipe 94 supplies gas to and permits the gas to exhaust from the upper motor through the passage-ways 96, 93, and 97.

My invention may be applied to a railway signaling system in any desired manner. I have shown diagrammatically in Fig. 11 the application of the invention to a railway system in which rail-circuits and wire-circuits are used to control the operation of the signals. Rail-circuits may be used throughout. In the drawings I have illustrated the application of the signal to a normal safety system of signaling. Obviously the signals may be operated on the normal danger plan. As illustrated in Fig. 11, the track is divided into the usual insulated sections A, B, C, and D, &c. Each section is supplied with its track-battery $98^a$ $98^b$ $98^c$, &c. The track-battery $98^b$ supplies current to the relay-magnet 99 by means of the relay-circuit 100. The relay-magnet 99 when energized closes switches 101 and 102, the switch 101 closing a break in the circuit of one of the distant signal-magnets and the switch 102 closing a break in the home-signal circuit 103, including the home-signal magnet 104 and battery $99^b$. When, as is normally the case, switch 102 is closed, the circuit of the home-signal magnet 104 is closed. Gas is thereby admitted to the lower cylinder, and the signal is moved to a predetermined position. If the distant-signal magnet 105 is also energized when the home-signal magnet is energized, the signal will move to "safety." This is accomplished by the circuits controlling the distant-signal magnet 105. The circuit for the distant signal 105 passes, by means of the wire 106, to the circuit-breakers 107, wires 108, 109, and 110 to circuit-breaker 111 of section C, switch 112, battery 113, return-wire 114, and wire 115, back to the distant magnet 105. Circuit-breaker 107, consisting of the flexible conductors $107^a$ and $107^b$, is controlled by a projection 116, which is an extension of the lever 63, controlled by the home magnet. The projection 116 transmits movement to the insulated button $107^c$, Fig. 9. The energization of the relay-magnet 117 of block C and of the home magnet 118 of block C controls the circuit of the distant magnet 105 in block B. Similar circuits control similar parts in the different blocks. Thus the circuit for the distant magnet 119 in block C is controlled by circuit-breaker 120, wires 121, circuit-breaker 122, switch 123, battery 124, and return-wires 125 and 126. In the condition of the parts shown the circuit-breaker 122 is open, magnet 119 is deenergized, and its armature is not attracted. The home magnet for section D is numbered 127. The circuit which controls it is numbered 128. The distant magnet for section D is numbered 129, and the circuit for controlling it passes through the circuit-breaker 130 and wires 131 to the circuit-breakers and battery of section E. (Not shown.)

The operation of the system illustrated in Fig. 11 is as follows: The train is shown on section D. Assume the parts at the positions indicated. A train on section A finds the signal for section B at "safety." The train enters B, which deënergizes the magnet 99, which opens the switch 122, thus deënergizing the home-signal magnet 104, which releases both detents 57 and 74, thus allowing the signal to go to "danger" behind the train. The train now goes from B toward block C. When nearing C, it finds the signal at block C showing "caution." This indicates that block C is clear, but that block D is occupied. The signal at block C is being held at "caution" by the following means controlled by the train in D: The relay 117 is energized, since there is no train on C, thus closing the switches 112 and $112^a$. The circuit through the home-signal magnet 118 is thereby closed; but the circuit through the distant magnet 119 is open at the circuit-closer 130 in section D. The circuit-closer 130 is kept open by the train in section D, which deënergizes the relay-magnet $123^a$, thus opening the circuit for the distant magnet 119 at 123. The relay-magnet $123^a$ opens the circuit for its home magnet 127 at $124^a$, which in turn opens the circuit for the distant magnet 119 at 122. The distant magnet 119 has its circuit open, therefore, at two points. The circuits controlling the signal at section C therefore are in a condition so that the home-signal magnet 118 has its circuit closed; but the distant-signal magnet 119 has its circuit open. The signal therefore stands at "caution." If the train should run from section B onto section C past the caution signal, it will set the signal from "caution" to "danger" behind the train. This is accomplished by deënergizing the relay-magnet 117, thus opening the circuit for the home magnet 118. The signal thus goes from "caution" to "danger." The train when on section C will also control the movement of the signal at B from "danger" to "caution." Another condition that has to be met with in practice is to move the signal from "caution" to "danger" when a train backs. Suppose, for example, that the circuits are in the condition shown in Fig. 11, with the train at D. When this train backs into section C it deenergizes the relay-magnet 117, which opens the circuit of the magnet 118, and the signal goes to "danger." Other conditions are met with; but the explanation of the operation of the system above given will make plain the operation of the system under any given condition.

It is to be understood that many changes may be made in the form of my apparatus without departing from the principle of my invention.

Having thus described my invention, what I claim, and desire to secure by Letters Patent, is—

1. In a railway signaling apparatus, the combination of a signal, a gas-operated motor for moving said signal to one position, a gas-operated motor for moving said signal to another position, and means whereby one motor bodily moves the other motor to operate the signal.

2. In a railway signaling apparatus, the combination of a signal, a gas-operated motor for moving said signal from danger to caution, a gas-operated motor for moving said signal from caution to safety, means whereby one motor bodily moves the other motor to operate the signal, a tank for liquefied gas, and means to supply gas to each of said motors.

3. In a railway signaling apparatus, the combination of a signal, a piston and its chamber for moving said signal from danger to caution, a piston and its chamber for moving said signal from caution to safety, means whereby one of the parts of the latter motor is actuated by the former motor, and means for moving the signal relatively to said part.

4. In a railway signaling apparatus, the combination of a signal, a piston for moving said signal from danger to caution, a piston and its chamber for moving said signal from caution to safety, and means for transmitting the movement of the former piston to the latter piston and piston-chamber.

5. In a railway signaling apparatus, the combination of a signal, a gas-operated motor for moving said signal from danger to caution, a gas-operated motor bodily moved by said former motor for moving the signal from caution to safety, one of said motors serving as an abutment for the other motor.

6. In a railway signaling apparatus, the combination of a signal, a gas-operated motor for moving said signal from danger to caution, a gas-operated motor bodily moved by said former motor for moving the signal from caution to safety, means for holding the signal at caution, said means acting as an abutment for the latter motor.

7. In a railway signaling apparatus, the combination of a signal, a gas-operated motor for moving said signal from danger to caution, a gas-operated motor bodily moved by said former motor for moving the signal from caution to safety, a detent for holding the signal at caution, said detent acting as an abutment for the latter motor, a tank for liquefied gas, and means for supplying gas to each motor.

8. In a railway signaling apparatus, the combination of a signal, a piston and its chamber for moving said signal, means for giving said piston and its chamber a bodily movement, and a detent for said means.

9. In a railway signaling apparatus, the combination of a signal, a piston and its chamber for moving said signal, a piston and its chamber for giving said signal an additional movement, each of said chambers having the same capacity, and means for transmitting the movement of the latter piston to the former piston and piston-chamber.

10. In a railway signaling apparatus, the combination of a signal, a piston and its chamber for moving said signal, a piston and its chamber for giving said signal an additional movement, each of said chambers having the same capacity, means for transmitting the movement of the latter piston to the former piston and piston-chamber, a tank for liquefied gas, and means for supplying gas to each of said chambers.

11. In a railway signaling apparatus, the combination of a signal, a piston and its chamber for moving said signal, a piston and its chamber for giving said signal an additional movement, each of said chambers having the same capacity, means for transmitting the movement of the latter piston to the former piston and its chamber, and a detent for said means.

12. In a railway signaling apparatus, the combination of a signal, of a piston and its chamber for moving said signal, a piston and its chamber for giving said signal an additional movement, a thrust member rigidly connecting the two pistons, said member transmitting a bodily movement to the latter piston and its chamber.

13. In a railway signaling apparatus, the combination of a signal, a piston and its chamber for moving said signal, a piston and its chamber for giving said signal an additional movement, and a thrust member permanently connecting one of said pistons to the other piston, said pistons and piston-chambers and thrust member having a common axis.

14. In a railway signaling apparatus, the combination of a signal, a piston and its chamber for moving said signal, means for admitting gas to said piston-chamber to produce the movement and for cutting off the supply of gas after the movement has been produced, a thrust member connected to one of said parts, a second piston and its chamber for giving the signal an additional movement, said thrust member transmitting the movement from the first piston and its chamber to the second piston and its chamber, one of the parts of the said second piston and its chamber being guided by said thrust member, means for admitting gas to and outting off the supply of gas from said second piston and piston-chamber, a detent for holding the signal at one position and another detent for holding the signal at another position, and means for releasing said detents.

15. In a railway signaling apparatus, the combination of a signal, a piston and its chamber for moving said signal from danger to caution, a piston and its chamber for moving said signal from caution to safety, said last-named piston and its chamber being bodily moved by said first-named piston, a detent for holding the signal at caution, a detent for holding the signal at safety, and means for operating said detents.

16. In a railway signaling apparatus, the combination of a signal, a piston and its chamber for moving said signal from danger to caution, a piston and its chamber for moving said signal from caution to safety, said last-named piston and its chamber being bodily moved by said first-named piston, a detent for holding the signal at caution, a detent for holding the signal at safety, means for operating said detents, a tank for liquefied gas, and means for supplying gas to each of said chambers.

17. In a railway signaling apparatus, the combination of a signal, a piston and its chamber for moving said signal from danger to caution, a detent for holding said signal at the caution position, a piston and its chamber moved bodily by the first-mentioned piston and its chamber to move the signal from caution to safety, a detent for holding said signal at safety, means for holding and releasing said detents, and means whereby when the former detent is released, the latter detent is also released.

18. In a railway signaling apparatus, the combination of a signal, a piston and its chamber for moving said signal from danger to caution, a detent for holding said signal at the caution position, a piston and its chamber moved bodily by the first-mentioned piston to move the signal from caution to safety, a detent for holding said signal at safety, means for holding and releasing said detents, means whereby when the former detent is released, the latter detent is also released, a tank for liquefied gas, and means for supplying gas to each of said chambers.

19. In a railway signaling apparatus, the combination of a signal, a piston and its chamber for moving said signal from danger to caution, a detent for holding said signal at the caution position, a piston and its chamber moved bodily by the first-mentioned piston and its chamber to move the signal from caution to safety, a detent for holding said signal at safety, means for holding and releasing said detents, and mechanical connections between said means for operating said detents whereby when the former detent is released the latter detent is also released.

20. In a railway signaling apparatus, the combination of a signal, a piston and its chamber for moving said signal from danger to caution, a detent for holding said signal at the caution position, a piston and its chamber for moving said signal from caution to safety, a detent for holding said signal at safety, means for operating each of said detents, said means for operating the last-named detent being operatable independently of the means for operating said first-named detent, mechanical connections between said means for operating said detents whereby when the former detent is released the latter detent is also released, a tank for liquefied gas, and means for supplying gas to each of said chambers.

21. In a railway signaling apparatus, the combination of a signal, a piston and its chamber for moving said signal to one position of indication, a piston and its chamber for moving said signal to another position of indication, a detent for holding said signal at the first-named position, a detent for holding said signal at the last-named position, a member for actuating the former detent, a rock-shaft, connections between said latter detent and said rock-shaft, connections between said rock-shaft and said member, said parts being so arranged that when said member is operated to release the former detent, the latter detent is also released.

22. In a railway signaling apparatus, the combination of a signal, a piston and its chamber for moving said signal to one position of indication, a piston and its chamber for moving said signal to another position of indication, a pivoted member, an electromagnet for actuating said member in one direction, a detent actuated by said member, a rock-shaft, an arm projecting from said rock-shaft, a detent pivoted in said arm, a member for actuating said last-named detent, an electromagnet for actuating said last-named member, an arm connected to said rock-shaft and projecting into the path of said first-named member.

23. In a railway signaling apparatus, the combination of a signal, a piston and its chamber for moving said signal from danger to caution, a piston and its chamber for moving said signal from caution to safety, said latter piston and its chamber being bodily moved by the former piston and its chamber, a pivoted detent for holding said signal at caution, a pivoted lever, an electromagnet for actuating said lever, an arm connected to said lever, connections between said arm and said detent, a projection on said lever, a rock-shaft, an arm connected to said rock-shaft, a detent pivoted in said arm, an electromagnet for actutaing said detent, a weight connected to said rock-shaft, a member projecting from said shaft, said member being normally in contact with said projection, and track-circuits for controlling the operation of said magnets.

In testimony whereof I have signed my name to this specification in the presence of two subscribing witnesses.

CLARENCE W. COLEMAN.

Witnesses:
WILLIAM F. BISSING,
EDWIN SEGER.